United States Patent
Morioka

(10) Patent No.: US 10,177,928 B2
(45) Date of Patent: Jan. 8, 2019

(54) METHOD, APPARATUS AND SYSTEM FOR DELIVERING CONTENT

(71) Applicant: SONY CORPORATION, Tokyo (JP)

(72) Inventor: Yuichi Morioka, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 57 days.

(21) Appl. No.: 15/303,560

(22) PCT Filed: Mar. 23, 2015

(86) PCT No.: PCT/EP2015/056154
§ 371 (c)(1),
(2) Date: Oct. 12, 2016

(87) PCT Pub. No.: WO2015/176851
PCT Pub. Date: Nov. 26, 2015

(65) Prior Publication Data
US 2017/0041158 A1 Feb. 9, 2017

(30) Foreign Application Priority Data
May 23, 2014 (EP) .................................... 14169734

(51) Int. Cl.
*H04L 12/18* (2006.01)
*H04W 4/20* (2018.01)
(Continued)

(52) U.S. Cl.
CPC ........ *H04L 12/189* (2013.01); *H04L 65/4084* (2013.01); *H04W 4/20* (2013.01); *H04W 88/06* (2013.01)

(58) Field of Classification Search
CPC ...... H04W 88/06; H04W 4/20; H04L 12/189; H04L 65/4084
See application file for complete search history.

(56) References Cited

U.S. PATENT DOCUMENTS 8,068,821 B2 11/2011 Bhatia et al.
8,548,465 B2 10/2013 Mueck et al.
(Continued)

FOREIGN PATENT DOCUMENTS

WO WO 2013/192137 A1 12/2013

OTHER PUBLICATIONS

International Search Report dated May 28, 2015 in PCT/EP2015/056154.
(Continued)

*Primary Examiner* — Rina C Pancholi
(74) *Attorney, Agent, or Firm* — Xsensus LLP

(57) ABSTRACT

A content server delivers content items on demand to communications devices, and includes: a network interface configured to receive a content request from each of the communications devices and, in response to the received content requests, to transmit the content item to each of the communications devices following the arrival of a predetermined time using a network and one of a plurality of wireless access interfaces, each of the wireless access interfaces being configured to transmit and/or receive signals using a different radio access technology; and a control unit configured to cause the content transmitter to select one of the wireless access interfaces for transmitting the content item based on the number of content requests received prior to the arrival of the predetermined time; wherein the network interface is configured to transmit a signaling message to each of the communications devices signaling the selected wireless access interface prior to transmitting the content item.

15 Claims, 6 Drawing Sheets

(51) Int. Cl.
*H04W 88/06* (2009.01)
*H04L 29/06* (2006.01)

(56) References Cited

U.S. PATENT DOCUMENTS

| | | |
|---|---|---|
| 2004/0034709 A1 | 2/2004 | Lee |
| 2005/0281218 A1* | 12/2005 | Maillard ............... H04W 28/14 370/328 |
| 2008/0006901 A1 | 1/2008 | Furukawa |
| 2008/0242290 A1 | 10/2008 | Bhatia et al. |
| 2009/0185522 A1* | 7/2009 | Periyalwar ............ H04W 48/18 370/328 |
| 2011/0106961 A1* | 5/2011 | Glasser ............... H04L 67/1008 709/231 |
| 2011/0122873 A1* | 5/2011 | Bijwaard .............. H04L 12/185 370/390 |
| 2011/0191404 A1* | 8/2011 | Kako ................... H04L 12/185 709/202 |
| 2011/0263250 A1 | 10/2011 | Mueck et al. |
| 2013/0294321 A1* | 11/2013 | Wang ..................... H04W 4/06 370/312 |
| 2013/0332621 A1* | 12/2013 | Keller ................... H04L 65/60 709/231 |
| 2014/0011538 A1* | 1/2014 | Mulcahy ............. H04L 67/2842 455/553.1 |
| 2014/0078906 A1 | 3/2014 | Chen et al. |
| 2014/0092730 A1 | 4/2014 | Yang |
| 2014/0328201 A1 | 11/2014 | Mulcahy et al. |
| 2014/0328202 A1 | 11/2014 | Mulcahy et al. |
| 2014/0329559 A1 | 11/2014 | Mulcahy et al. |
| 2014/0335911 A1 | 11/2014 | Mulcahy et al. |

OTHER PUBLICATIONS

Adel Al-Hezmi, et al., "IPTV Session Mobility", Fraunhofer FOKUS, 2006, pp. 1-14.

Shahriar Nirjon, et al., "MultiNets: Policy Oriented Real-Time Switching of Wireless Interfaces on Mobile Devices", <http://ieeexplore.ieee.org/abstract/document/6200056/>, 2012, 10 Pages.

* cited by examiner

METHOD, APPARATUS AND SYSTEM FOR DELIVERING CONTENT

CROSS-REFERENCE TO RELATED APPLICATIONS

The present application is based on PCT filing PCT/EP2015/056154 filed Mar. 23, 2015, and claims priority to European Patent Application 14 169 734.2, filed in the European Patent Office on May 23, 2014, the entire contents of each of which being incorporated herein by reference.

BACKGROUND

Field of the Disclosure

The present technique relates to a method, apparatus and system for delivering content.

Description of the Related Art

The "background" description provided herein is for the purpose of generally presenting the context of the disclosure. Work of the presently named inventors, to the extent it is described in the background section, as well as aspects of the description which may not otherwise qualify as prior art at the time of filing, are neither expressly or impliedly admitted as prior art against the present technique.

Modern communications devices (such as mobile telephones) are able to perform data communication with a network using a range of different wireless access interfaces with that network. These wireless access interfaces include cellular wireless access interfaces, such as those conforming to the Global System for Mobile Communications (GSM) or Long-Term Evolution (LTE) standards. They also include local wireless access interfaces, such as those conforming to the Wi-Fi or Bluetooth standards or those which make use of unlicensed LTE spectrum (LTE-U). They include broadcast wireless access interfaces, such as those conforming to the Digital Video Broadcast-Handheld (DVB-H) or Multimedia Broadcast Multicast Services (MBMS) standards.

In general, each of these types of wireless access interface will be associated with a different cost per unit data. For example, it will generally be cheaper for a communications device to receive data using a local or broadcast wireless access interface than a cellular wireless access interface. Where possible, it is therefore desirable for a user of a communications device to be able to use the cheapest wireless access interface available in order to download data. This is especially true when it comes to downloading large amounts of data such as that associated with music or video content.

A problem, however, is that a user will generally have to select manually which type of wireless access interface to use at any given time. This is not only inconvenient for the user, but is also unlikely to make the most efficient use of the communications resources of the various wireless access interfaces available. This is because the user may very well continue to use a particular wireless access interface once it has been selected for downloading a particular content item even if a less costly wireless access interface then becomes available. An aim of the present technique is therefore to make improvements to the use of communications resources of wireless access interfaces when downloading content.

SUMMARY

A first aspect of the present technique provides a content server for delivering a content item on demand to communications devices, comprising: a network interface configured to receive a content request from each of the communications devices and, in response to the received content requests, to transmit the content item to each of the communications devices following the arrival of a predetermined time using a network and one of a plurality of wireless access interfaces, each of the wireless access interfaces being configured to transmit and/or receive signals using a different radio access technology; and a control unit configured to cause the content transmitter to select one of the wireless access interfaces for transmitting the content item based on the number of content requests received prior to the arrival of the predetermined time; wherein the network interface is configured to transmit a signaling message to each of the communications devices signaling the selected wireless access interface prior to transmitting the content item.

Optionally, the plurality of wireless access interfaces comprises a cellular wireless access interface, a local wireless access interface and a broadcast wireless access interface.

Optionally, the control unit is configured to select the broadcast wireless access interface for the transmission of the content item when the number of content requests received prior to the arrival of the predetermined time reaches a predetermined threshold number and to select the cellular or local wireless access interface for transmission of the content item when the number of content requests received prior to the arrival of the predetermined time does not reach the predetermined threshold.

Optionally, when the broadcast wireless access interface is selected, the network interface is configured to transmit a broadcast signaling message to each of the communications devices as the signaling message, the broadcast signaling message comprising instructions to be processed by each of the communications devices so as to allow each communications device to receive the broadcast content item, and when the cellular or local wireless access interface is selected, the network interface is configured to transmit a download signaling message to each of the communications devices as the signaling message, the download signaling message indicating to each of the communications devices that the content item is to made available for download from the content server using the cellular or local wireless access interface.

Optionally, the cellular wireless access interface conforms to one of the Global System for Mobile Communications (GSM) or Long-Term Evolution (LTE) standards, the local wireless access interface conforms to one of the Wi-Fi or Bluetooth standards or makes use of unlicensed LTE spectrum (LTE-U), and the broadcast wireless access interface conforms to one of the Digital Video Broadcast-Handheld (DVB-H) or Multimedia Broadcast Multicast Services (MBMS) standards.

A second aspect of the present technique provides communications device for receiving a content item on demand from a content server, comprising: a plurality of communications interfaces each configured to transmit and/or receive signals with a different wireless access interface using a different radio access technology, wherein a first one of the plurality of communications interfaces is configured to transmit a content request to the content server, a second one of the plurality of communications interfaces is configured to receive the content item from the content server following the arrival of a predetermined time, and a third one of the plurality of communications interfaces is configured to receive a signaling message from the content server prior to the receiving of the content item by the second communications interface, the signaling message signaling which one of the plurality of communications interfaces is to be the second communications interface for receiving the content item; and a control unit configured to select the second communications interface for receiving the content item from the plurality of communications interfaces in accordance with the signaling message.

Optionally, the plurality of communications interfaces comprises a cellular communications interface, a local communications interface and a broadcast communications interface, and: the first communications interface is one of the cellular and local communications interfaces; the second communications interface is one of the cellular, local or broadcast communications interfaces; and the third communications interface is one of the cellular and local communications interfaces.

Optionally, the control unit is configured to select the cellular or local communications interface as the first and/or third communications interface depending on which of the cellular and local communications interfaces are able to communicate with the content server, with preference given to the local communications interface in the case that both the cellular and local communications interfaces are able to communicate with the content server.

Optionally, the signaling message is one of a broadcast signaling message and a download signaling message, wherein: when the signaling message is the broadcast signaling message, the control unit is configured to select the broadcast communications interface as the second communications interface, the broadcast signaling message comprising instructions to be processed by the control unit so as to allow the communications device to receive the content item using the broadcast communications interface; and when the signaling message is the download signaling message, the control unit is configured to select one of the cellular and local communications interfaces as the second communications interface, the download signaling message indicating to the control unit that the content item is to be made available for download from the content server using the cellular or local communications interface.

Optionally, when the content item is to be made available for download from the content server, the cellular or local communications interface is chosen as the second communications interface depending on which of the cellular and local communications interfaces are able to communicate with the content server, with preference given to the local communications interface in the case that both the cellular and local communications interfaces are able to communicate with the content server.

Optionally, the cellular communications interface conforms to one of the Global System for Mobile Communications (GSM) or Long-Term Evolution (LTE) standards, the local communications interface conforms to one of the Wi-Fi or Bluetooth standards or makes use of unlicensed LTE spectrum (LTE-U), and the broadcast communications interface conforms to one of the Digital Video Broadcast-Handheld (DVB-H) or Multimedia Broadcast Multicast Services (MBMS) standards.

A third aspect of the present technique provides a method of delivering a content item on demand to communications devices, comprising: receiving a content request from each of the communications devices and, in response to the received content requests, transmitting the content item to each of the communications devices following the arrival of a predetermined time using a network and one of a plurality of wireless access interfaces, each of the wireless access interfaces being configured to transmit and/or receive signals using a different radio access technology; and selecting one of the wireless access interfaces for transmitting the content item based on the number of content requests received prior to the arrival of the predetermined time; wherein a signaling message is transmitted to each of the communications devices signaling the selected wireless access interface prior to transmitting the content item.

A fourth aspect of the present technique provides a program for controlling a computer to perform a method as provided by the third aspect.

A fifth aspect of the present technique provides a recording medium storing a program as provided by the fourth aspect.

A sixth aspect of the present technique provides a method of receiving a content item on demand from a content server, comprising: transmitting a content request to the content server using a first one of a plurality of communications interfaces each configured to transmit and/or receive signals with a different wireless access interface using a different radio access technology; receiving the content item from the content server following the arrival of a predetermined time using a second one of the plurality of communications interfaces; receiving a signaling message from the content server using a third one of the plurality of communications interfaces prior to the receiving of the content item by the second communications interface, the signaling message signaling which one of the plurality of communications interfaces is to be the second communications interface for receiving the content item; and selecting the second communications interface for receiving the content item from the plurality of communications interfaces in accordance with the signaling message.

A seventh aspect of the present technique provides a program for controlling a computer to perform a method as provided by the sixth aspect.

An eighth aspect of the present technique provides a recording medium storing a program as provided by the seventh aspect.

The present technique alleviates the above-mentioned problem(s) because the wireless access interface for transmitting the content item is selected based on the number of content requests received prior to the arrival of the predetermined time for transmitting the content item. Thus, the most cost effective wireless access interface may be chosen in accordance with the demand for the content item. In other words, the demand for a particular content item prior to the predetermined time for transmitting the content item is used in order to make efficient use of the various wireless access interfaces available for delivering the content item. The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
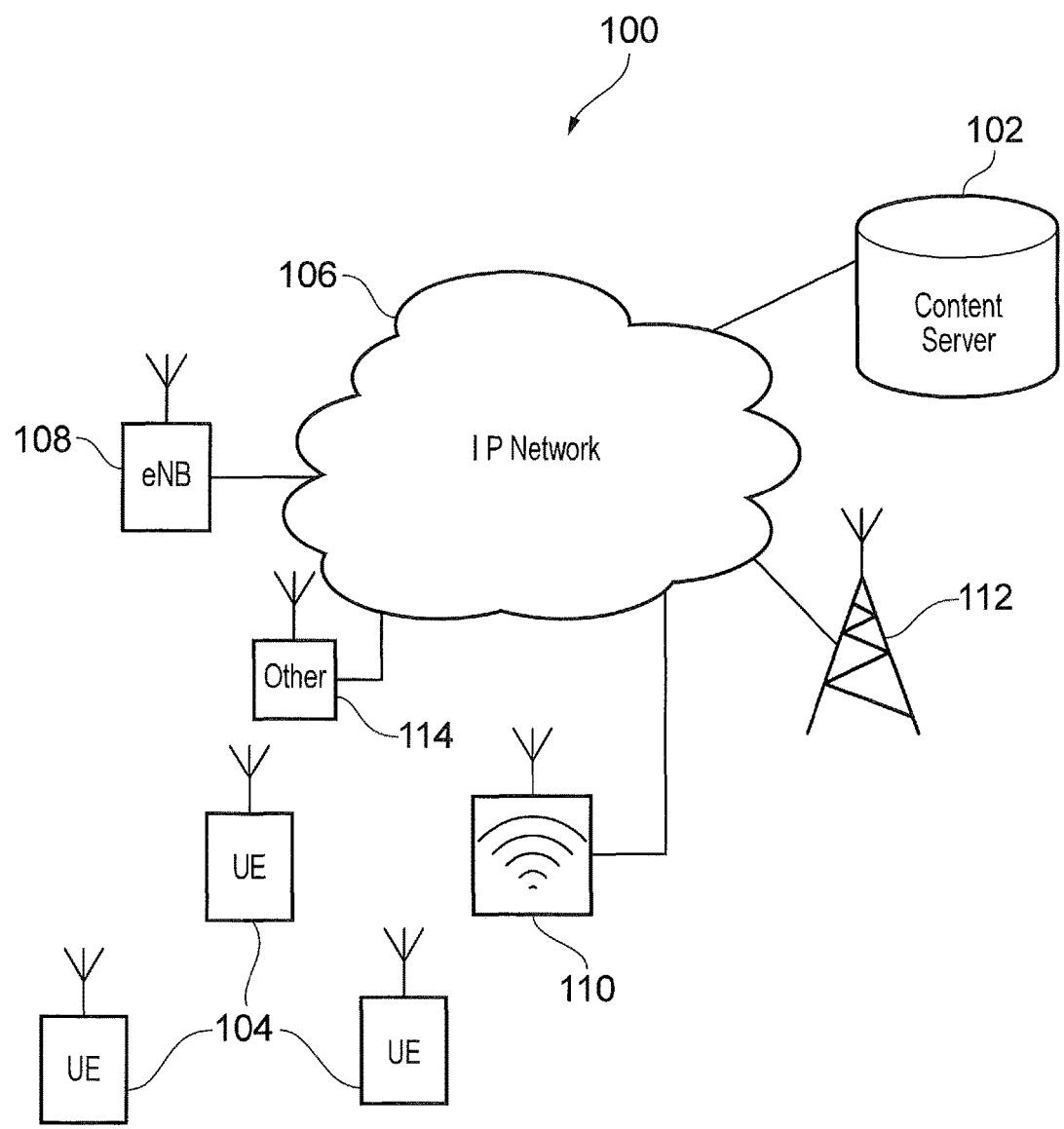
FIG. 1 schematically illustrates a content distribution system according to an embodiment of the present technique.

Referring now to the drawings, wherein like reference numerals designate identical or corresponding parts throughout the several views.

FIG. 1 schematically illustrates a content distribution system 100 according to an embodiment of the present technique. The system 100 comprises a content server 102 for storing content and a plurality of communications devices 104 (also known as user equipment UE) for receiving content from the content server 102. The content server 102 and communications devices 104 are in communication via an Internet Protocol (IP) network 106 or alternative. The network comprises a plurality of wireless access interfaces, each of which is operable to wirelessly transmit and receive signals to and from the communications devices 104.

Each of the wireless access interfaces is configured to transmit and receive signals using a different radio access technology (RAT). More specifically, a cellular wireless access interface 108 is configured to transmit and receive signals using a cellular radio access technology (such as GSM or LTE), a local wireless access interface 110 is configured to transmit and receive signals using a local radio access technology (such as Wi-Fi, Bluetooth or LTE-U) and a broadcast wireless access interface 112 is configured to transmit and receive signals using a broadcast radio access technology (such as DVB-H or MBMS). A further wireless access interface 114 may also be included which uses any other suitable radio access technology for enabling communication with the communications devices 104. It is noted that, although each of the wireless access interfaces shown in FIG. 1 is represented as being implemented via a separate physical entity, two or more wireless access interfaces may be implemented using the same physical entity. For example, an LTE cellular wireless access interface and MBMS broadcast wireless access interface (more specifically, an Evolved Multimedia Broadcast Multicast Service (eMBMS) wireless access interface) will, in reality, be implemented using the same physical entity.

As will be explained in more detail, the system 100 allows a content item, such as a film or TV show, to be delivered from the content server 102 to one or more of the communications devices 102 using one of the wireless access interfaces. The wireless access interface that is chosen for this delivery is decided by the content server 102 based on the number of communications devices 102 which send a request for a particular content item.

Figure 2:
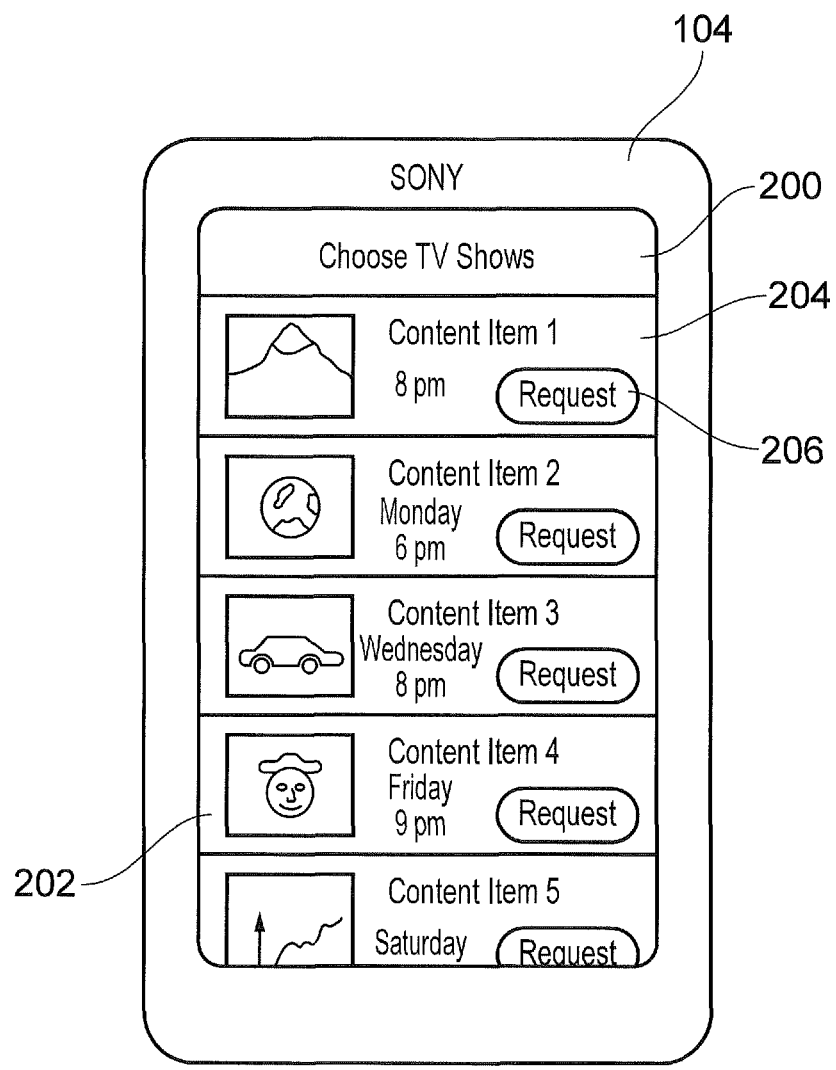
FIG. 2 schematically illustrates a communications device according to an embodiment of the present technique.

FIG. 2 schematically illustrates a communications device 104 according to an embodiment of the present technique. The communications device 104 is a mobile phone comprising a touch screen 200 for displaying content to the user. The user is able to use the touch screen 200 to choose and view content that is delivered by the content server 102. In FIG. 2, it can be seen that a content selection screen 202 is displayed on the touch screen 200. The content selection screen 202 displays a plurality of content item information windows 204 which each give information about a content item that can be requested by the user and delivered to the communications device 104. It can be seen that each window 204 displays the name of the content item ("Content Item 1", "Content Item 2", etc.), a predetermined time for when the content item becomes available (including the time of day and, if necessary, the name of the day) and a virtual request button 206 which allows the user to select a particular content item.

When the user finds a content item that is to be viewed from the content selection screen 202, they activate the virtual button 206 included in the content item information window 204 for the relevant content item. This causes the communications device to send a content request to the content server 102 for the chosen content item. According to the present technique, depending on the number of communications devices 104 which send a request for a particular content item prior to the predetermined time for making that content item available, the content server 104 chooses the most appropriate wireless access interface for transmitting the chosen content item once the predetermined time has arrived.

Figure 3:
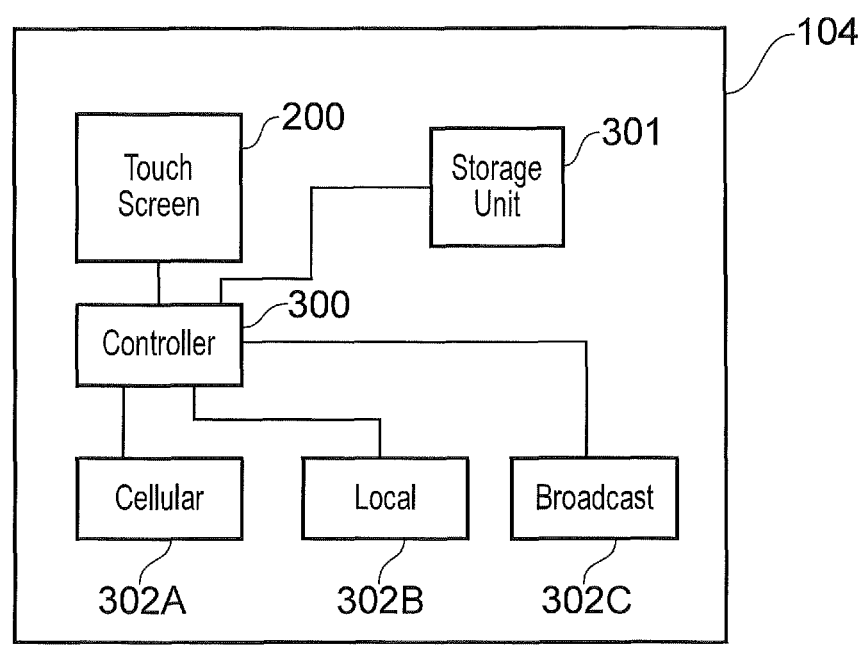
FIG. 3 schematically illustrates internal components comprised by the communications device.

FIG. 3 schematically illustrates internal components comprised by the communications device 104 of FIG. 2. As already mentioned, the communications device 104 comprises a touch screen 200 for displaying information and content to the user and for receiving input from the user. It will be appreciated, however, that other devices could also be used. For example, the communications device could comprise a non-touch screen (for example, a standard liquid crystal display screen or the like) for displaying information to the user and physical buttons (such as an alphanumeric keypad or the like) for receiving input from the user.

The communications device 104 also comprises a controller 300 for controlling the operation of the communications device 104, a storage unit 301 for storing content delivered to the communications device 104 and a plurality of communications interfaces 302A-B. Each of the communications interfaces 302A-C allow the communications device 104 to communicate with the network 106 through one of the cellular wireless access interface 108, local wireless access interface 110 and broadcast wireless access interface 112. More specifically, cellular communications interface 302A is for communicating using the cellular wireless access interface 108, local communications interface 302B is for communicating using the local wireless access interface 110 and broadcast communications interface 302C is for communicating using the broadcast access interface 112.

Each of the communications interfaces 302A-C is configured to act as a content receiver. In addition, each of the communications interfaces 302A-B is configured to act as a content request transmitter and a signaling message receiver.

As a content request transmitter, the communications interfaces 302A-B are each configured to transmit a content request to the content server 102 following a user selection of a particular content item. As a content receiver, the communications interfaces 302A-C are each configured to receive the content item from the content server at the predetermined time for the content item. The specific wireless access interface actually used for receiving the content item (and thus the specific communications interface actually used) is determined by the content server 102 on the basis of the number of communications devices 104 which have sent a content request for the particular content item prior to the predetermined time for the content item. As a signaling message receiver, the communications interfaces 302A-B are each configured to receive a signaling message from the content server 102 signaling the wireless access interface to be used for the content item delivery prior to the predetermined time for the content item.

Figure 4:
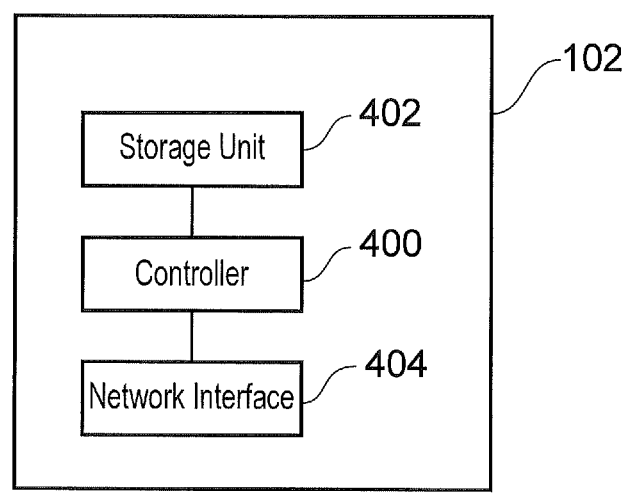
FIG. 4 schematically illustrates internal components comprised by a content server according to an embodiment of the present technique.

FIG. 4 schematically illustrates internal components comprised by the content server 102 according to an embodiment of the present technique. The content server 102 comprises a storage unit 402 for storing content items, a controller 400 for controlling the operation of the content server 102 and a network interface 404. The network interface 404 allows the content server 102 to communicate with the network 106 and, ultimately, with the communications devices 104 through at least one of the cellular wireless access interface 108, local wireless access interface 110 and broadcast wireless access interface 112.

The network interface 404 is configured to act as a content request receiver, a signaling message transmitter and a content transmitter. As a content request receiver, the network interface 404 is configured to receive a content request from one or more of the communications devices 104. As a content transmitter, the network interface 404 is configured to transmit the content item identified by the content request to the one or more communications devices 104 at the predetermined time for the content item using the network 106 and one of the wireless access interfaces. As a signaling message transmitter, the network interface 404 is configured to transmit a signaling message to the one or more communications devices 104 signaling the selected wireless access interface to be used for the content item delivery prior to the predetermined time for the content item.

The controller 400 of the content server 102 is configured to select one of the wireless access interfaces for delivering the content item based on the number of content requests received prior to the predetermined time. More specifically, prior to the predetermined time for a particular content item, the controller 400 counts the number of content requests received for that content item. If the number of requests prior to the predetermined time reaches a predetermined threshold number, then the broadcast wireless access interface 112 (which uses, for example, DVB-H or MBMS) is used to deliver the content item to the communications devices 104 at the predetermined time. On the other hand, if the number of requests prior to the predetermined time does not reach the predetermined threshold number, then one of the cellular or local wireless access interfaces 108, 110 (which use, for example, LTE or Wi-Fi, respectively) is used to deliver the content item to the communications devices 104 at the predetermined time. In this case, the cellular or local wireless access interface 108, 110 is chosen depending on which of these wireless access interfaces is available to each communications device 104 at the predetermined time, with the local wireless access interface 110 generally being preferred.

As will be explained later, in the case that the threshold number of content requests is not reached, the content server makes the requested content item available for download for the communications devices 104. This download will be carried out using the cellular or local wireless access interface 108, 110, depending on which of these interfaces is available to each communications device 104. Since the decision as to whether the cellular or local wireless access interface is used is ultimately decided by each individual communications device 104 (depending on network coverage, etc.), the content server 102 effectively considers the cellular and wireless access interfaces 108, 110 as a single cellular or wireless access interface through which signaling messages and content items may be transmitted. The signaling message or content item is simply routed to the each communications device 104 from the content server 102 over the network 106 using the IP address each communications device 104.

In general, each of the wireless access interfaces will be associated with a different cost per unit data. More specifically, the cellular wireless access interface 108 is often the most costly, followed by the local wireless access interface 110 and then, as the least costly, the broadcast wireless access interface 112. However, due to a limited number of broadcast channels, it will often only be considered worth dedicating a broadcast channel to the transmission of a particular content item if there is sufficient demand for that content item.

With the above described arrangement, the demand for a particular content item is known because the controller 400 counts the number of content requests received for that content item prior to the predetermined time at which that content item is made available. If the threshold number of received requests reaches the threshold number, then the demand is considered to be sufficient for a broadcast channel to be dedicated to the transmission of the content item. This allows the communications devices to receive the content item using the least costly broadcast wireless access interface 112 once the predetermined time for the content item has arrived. This is particularly advantageous, since if the threshold number of requests is reached prior to the arrival of the predetermined time for the content item, then the more expensive cellular and local wireless access interfaces 108, 110 need never be used in delivering the content item to the communications devices 104, resulting in improved network efficiency and significant cost savings. If the threshold number of received requests does not reach the threshold number, then the demand is not considered to be sufficient for a broadcast channel to be dedicated to the transmission of the content item. However, even in this case, there is still a choice between the cellular and local wireless access interfaces 108, 110. Thus, cost savings can still be achieved if as many communications devices 104 as possible use the local wireless access interface 110. Embodiments of the present technique thus use the demand for a particular content item prior to the predetermined time at which it is made available in order to make efficient use of the various wireless access interfaces available for delivering the content item.

Figure 5:
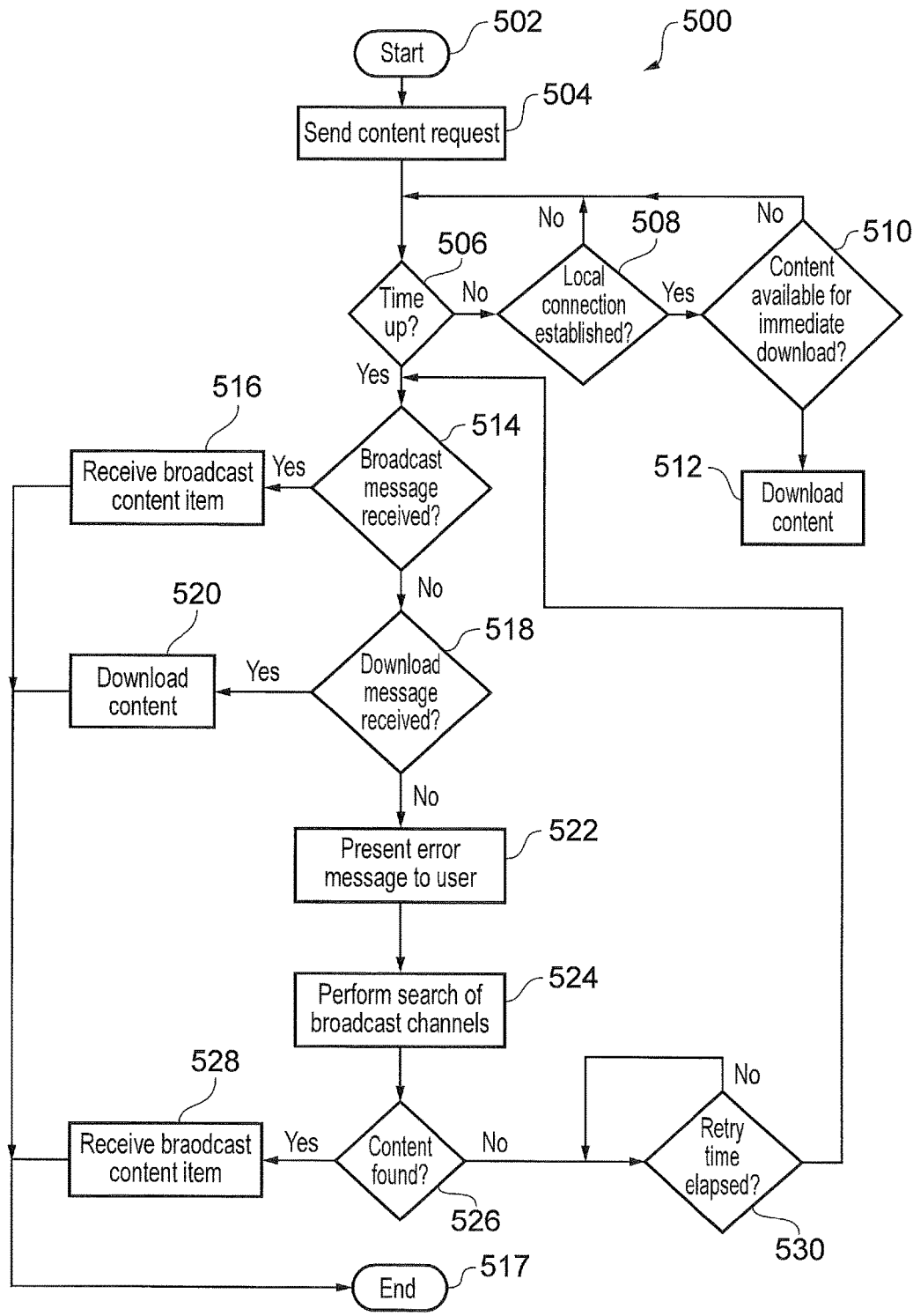
FIG. 5 illustrates a flow chart showing a process carried out by the communications device.

FIG. 5 illustrates a flow chart showing a process 500 carried out by the communications device 104 according to an embodiment of the present technique. The process 500 is carried out under the control of the controller 300.

The process starts at step 502. At step 504, a content request is sent to the content server 102 in response to the selection of a particular content item by the user. The content request comprises the IP address of the communications device 104 and identifies the selected content item. The content request is transmitted using either the cellular or local wireless access interface 108, 110. The content item is associated with a predetermined time at which it is to become available for viewing by the user. At step 506, it is determined as to whether or not the predetermined time has been reached.

If the predetermined time has not been reached, then the process moves onto step 508. At 508, it is determined as to whether or not the communications device 104 is able to communicate with the network 106 using the local wireless access interface 110. For example, it is determined as to whether or not the communications device 104 is within range of a user's home wireless local area network (WLAN) or within range of a Wi-Fi hotspot. If it is determined that the communications device 104 is not able to communicate using the local wireless access interface 110, then the process returns to the beginning of step 506. On the other hand, if it is determined that the communications device 104 is able to communicate using the local wireless access interface 110, then the process moves onto step 510.

At step 510, it is determined as to whether or not the requested content item is available for an immediate download. Although the content item is associated with a predetermined time at which it is to be made available to the user, it may be the case that the content item becomes available immediately when the user's communications device 104 is in communication with the local wireless access interface 110, thus allowing the user to take advantage of the relatively low cost per unit data associated with the local wireless access interface 110 and to obtain the requested content item more quickly. Whether or not a particular content item is available for instant download is decided in advance by the proprietor of the content item. In the case that the content item is available for immediate download, the process moves onto step 512, at which point the communications device 104 downloads the content. On the other hand, in the case that the content item is not available for immediate download (this may be the case, for example, with popular new TV shows in which an episode is released on, say, a weekly basis), then the process returns to the beginning of step 506.

When, at step 506, it is determined that the predetermined time has been reached, the process moves onto step 514. At step 514, it is determined as to whether or not a signaling message indicating that the content item is to be delivered to the communications device 104 using the broadcast wireless access interface 112 has been received from the content server 102. This is referred to as a broadcast signaling message. This broadcast signaling message will be received over the network 106 using one of the cellular or local wireless access interfaces 108, 110 if the content server 102 determines that the number of requests for the content item has reached the predetermined threshold number. The broadcast signaling message is receivable over the network 106 because it comprises the IP address of the communications device 104 (this being included in the original content request) as the target IP address.

If a broadcast signaling message has been received, then the process moves onto step 516, in which the communications device 104 receives the requested content item from the content server using the broadcast wireless access interface 112. The broadcast signaling message contains instructions which are processed by the controller 300 so as to allow the communications device 104 to receive the broadcast content item. For example, if the broadcast wireless access interface 112 uses MBMS, then the broadcast signaling message contains instructions to activate reception of the MBMS broadcast service. As another example, if the broadcast wireless access interface 112 uses DVB-H, then the broadcast signaling message contains instructions to tune to the DVB-H channel over which the content item is to be broadcast. Following the reception of the broadcast content item at step 516, the process ends at step 517.

If the broadcast signaling message has not been received, then the process moves onto step 518. At step 518, it is determined as to whether or not a signaling message indicating that the content item is to be delivered to the communications device 104 using one of the cellular or wireless access interfaces 108, 110 has been received from the content server 102. This is referred to as a download signaling message. This download signaling message will be received over the network 106 using one of the cellular or local wireless access interfaces 108, 110 if the content server 102 determines that the number of requests for the content item has not reached the predetermined threshold number. The download signaling message is receivable over the network 106 because it comprises the IP address of the communications device 104 (this being included in the original content request) as the target IP address.

If the download signaling message has been received, then the process moves onto step 520 in which the content item is downloaded from the content server 102 via one of the cellular and local communications interfaces 302A, 302B, depending on which of the cellular and local wireless access interfaces 108, 110 is available to the communications device 104. Due to the lower cost per unit data, the local wireless access interface is preferred. Thus, if the local wireless access interface 108 is available, then the content item will be downloaded using the local communications interface 302B. If the local wireless access interface 108 is not available, then the cellular wireless access interface 110 will be used, meaning that the content item will be downloaded using the cellular communications interface 302A. In general, at least one of the cellular and local wireless access interfaces 108, 110 will be available because, otherwise, it would not have been possible for the communications device to have received the download signaling message at step 518. Once the content item has been downloaded, the process then ends at step 517.

If, at step 518, it is determined that the download signaling message has not been received, then the process moves onto step 522. In this case, neither a broadcast signaling messaging nor a download signaling message has been received by the communications device 104. This will generally be due to the communications device 104 not being able to communicate with the network 106 through either of the cellular or local wireless access interfaces 108, 110. For example, the communications device 104 may not be within the range of a Wi-Fi signal and may also not be in an area covered by a cellular network. Thus, in step 522, an error message is presented to the user informing them that the content item is currently unavailable.

It is noted that the communications device 104 may have a different IP address depending on whether the cellular or local wireless access interface 108, 110 is used for communication with the network 106. This is because the cellular and local communications interfaces 302A, 302B represent two different physical connections to the network 106. Thus, a problem may be caused if, for example, the communications device 104 transmits the content request using the cellular wireless access interface 108 (the content request thus comprising a first IP address of the communications device 104) but then, after sending the content request and prior to the predetermined time of the content item, the communications device 104 finds itself in range of a Wi-Fi network and connects to the network 106 using the local wireless access interface 110 (thus establishing a second, different IP address of the communications device 104). In this case, the broadcast/download message signaling message may not be received by the communications device 104 due to the change in IP address. In order to overcome this problem, the communications device 104 may transmit a message to the content server 102 alerting it of any change in the IP address of the communications device 104 following transmission of the original content request. At the predetermined time for the content item, the content server 102 will then transmit the broadcast/download signaling message to the communications device 104 using the new IP address. On the other hand, the communications device 104 may make use of an arrangement such as Dual Stack Mobile IP (DSMIP), which allows the IP address of the communications device 104 to remain consistent even if the connection with the network 106 switches between using the cellular and local wireless access interfaces 108, 110.

After the error message is presented to the user in step 522, the process then moves onto step 524 in which the broadcast communications interface 302C performs a search of the broadcast channels made available for the broadcast wireless access interface 112. For some broadcast standards, such as DVB-H, information identifying a content item being broadcast over a channel is included in the packet headers of data packets for that channel. Thus, in the case that the communications device 104 has not received one of a broadcast or download signaling message, there is still a chance that the content item can be delivered to the communications device 104 if the content item is being transmitted using the broadcast wireless access interface 112. In this case, the broadcast communications interface 302C successively switches between a plurality of channels made available by the broadcast wireless access interface 112 and searches each channel for a packet header identifier of the content item. The packet header identifier of the content item is known to the communications device 104 since, for example, it may have been included in the information used to generate the content selection screen 202 and stored in the storage unit 301 of the communications device 104 following selection of the content item by the user.

At step 526, it is determined as to whether or not the content item has been identified following the search of the broadcast channels. If the content item has been identified, then the process moves onto step 528, in which the broadcast communications interface 302C is tuned to a channel for which the content item was identified. The user is therefore able to receive the content item despite the fact that they were not able to receive the broadcast signaling message. The process then ends at step 517.

If, at step 526, it is determined that the content item has not been identified, then the process moves onto step 530, in which it is determined as to whether or not a retry time has elapsed. The retry time is a time for which the communications device 104 must wait before reattempting to receive the broadcast or download signaling message. This gives the user a chance to relocate the communications device 104 to a location in which cellular or local network access is more reliable, thus improving the chance that the communications device 104 is able to receive the broadcast or download signaling message and thus to receive the content item. The retry time may be any suitable time period determined by the skilled person. For example, the retry time may be 10, 20 or 30 seconds or even 1 or 2 minutes. If the retry time has not elapsed, then the process returns to the beginning of step 530. On the other hand, if the retry time has elapsed, then the process returns to the beginning of step 514. The existence of the retry time helps to prevent the communications device 104 from continuously reattempting to receive the broadcast or download signaling messages when the communications device 104 is still likely to be in location with little or no local or cellular network coverage. Thus reduces unnecessary power consumption by the communications device 104.

It is noted that, at step 524, all broadcast channels made available by the broadcast wireless access interface 112 may be searched during a single iteration of this step. On the other hand, only a portion of the available broadcast channels may be searched during a single iteration. More specifically, in a first iteration of the step, a first portion of the available broadcast channels is searched and then, in a second iteration of the step (occurring if the content item is not identified during the first iteration and if it is still determined that neither a broadcast nor a download signaling message has been received), a second, different portion of the available broadcast channels is searched. This continues with a third, fourth, etc. iteration, as necessary. Searching only a portion of the available channels during each iteration of step 524 takes a shorter time than searching all available channels during each iteration. Thus, over a given time period, the communications device 104 is given a greater number of opportunities to reattempt receiving the broadcast or download signaling message when only a portion of the available channels is searched. This allows the user to receive the broadcast or download signaling message and, as a result, the content item more quickly in the case that cellular and/or local network coverage is restored.

Steps 522, 524, 526 and 528 are generally only applicable to the use of non-cellular broadcast services such as DVB-H. Thus, if MBMS is used for the broadcast wireless access interface 112, then these steps will be omitted. In this case, if neither a broadcast nor download signaling message is received, then the communications device 104 will simply check again for whether or not a broadcast or download signaling message has been received (after the retry time has elapsed in step 530) and repeat this for as long as necessary. If, after repeated checks, the broadcast signaling message is received, then the broadcast signaling message causes reception of the MBMS broadcast service to be activated at the communications device 104. If the communications device 104 is within range of the MBMS broadcast wireless interface (for example, if the communications device 104 is within range of the LTE wireless access interface through which the eMBMS service operates), then the communications device 104 is then able to receive the broadcast content item.

Figure 6:
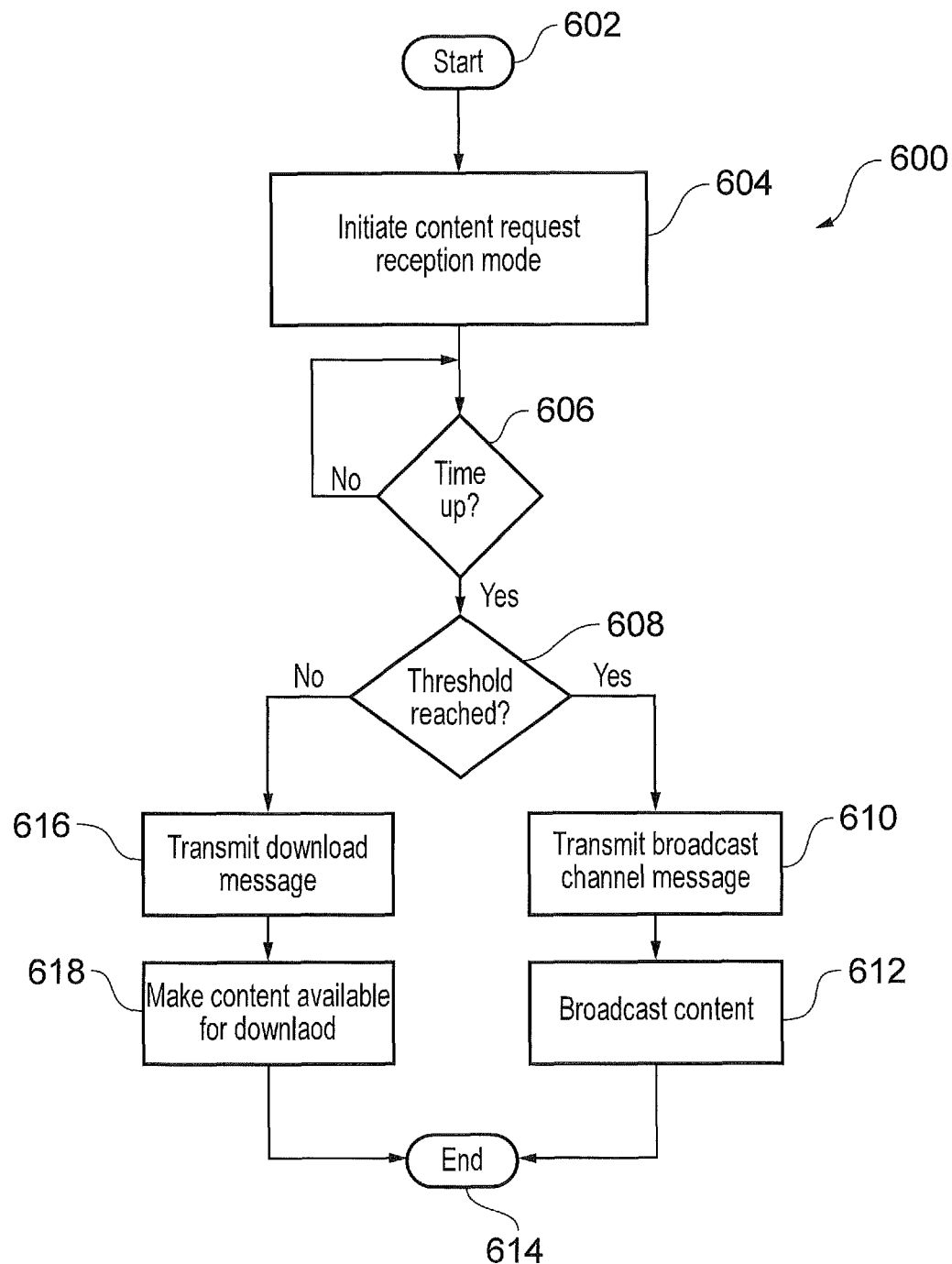
FIG. 6 illustrates a flow chart showing a process carried out by the content server.

FIG. 6 illustrates a flow chart showing a process 600 carried out by the content server 102 according to an embodiment of the present technique. The process 600 is carried out under the control of the controller 400.

The process 600 starts at step 602. At step 604, a content request reception mode of the content server 102 is activated. In this mode, the server 102 is receptive to content requests for a particular content item transmitted from each of the communications devices 104. As already mentioned, the content item is associated with a predetermined time at which the content item is to be made available for transmission to the communications devices 104. At step 606, it is determined whether or not the predetermined time has been reached. If the predetermined time has not been reached, the process returns to the beginning of step 606. On the other hand, if the predetermined time has been reached, the process moves onto step 608.

At step 608, it is determined as to whether or not the threshold number of content requests for the content item has been reached.

If the threshold number has been reached, then the process moves onto step 610, in which the content server 102 transmits the broadcast signaling message to each of the communications devices 104 from which a content request has been received. The content server 102 knows which of the communication devices 104 to which to transmit the broadcast signaling message because each content request comprises the IP address of the specific communications device 104 from which it was sent. As previously mentioned, if the IP address of any of the communications devices 104 changes after sending the content request (due to, for example, the communications device concerned changing the wireless access interface by which it communicates with the network 106), then the communications device concerned transmits a message to the content server 102 notifying it of the updated IP address prior to the transmission of the broadcast signaling message. The broadcast signaling message is transmitted to the communications devices 104 over the network 106 and via one of the cellular or local wireless access interfaces 108, 110 (depending on which network is available to each communications device 104, as previously discussed). The broadcast signaling message informs each communications device 104 that the content is to be broadcast and, as already mentioned contains instructions which allow the broadcast communications interface 302C to receive the broadcast content item.

At step 612, the content item is then broadcast to the communications devices 104 using the network 106 and broadcast wireless access interface 112 (which is, for example, a DVB-H or MBMS wireless access interface). The process then ends at step 614.

On the other hand, if the threshold number has not been reached at step 608, then the process moves onto step 616, in which the content server 102 transmits the download signaling message to each of the communications devices 104 from which a content request has been received. The content server 102 knows which of the communication devices 104 to which to transmit the download signaling message because each content request comprises the IP address of the specific communications device 104 from which it was sent. As previously mentioned, if the IP address of any of the communications devices 104 changes after sending the content request (due to, for example, the communications device concerned changing the wireless access interface by which it communicates with the network 106), then the communications device concerned transmits a message to the content server 102 notifying it of the updated IP address prior to the transmission of the download signaling message. The download signaling message is transmitted to the communications devices 104 over the network 106 and via one of the cellular or local wireless access interfaces 108, 110 (depending on which network is available to each communications device 104, as previously discussed). The download signaling message informs each communications device 104 that the content is to be made available for download from the content server 102.

At step 612, the content item is then made available for download to the communications devices 104. In one embodiment, the content item is made available for manual download from the content server 102. For example, a user may download the content item to their communications device 104 by visiting a particular website associated with the content server 102 or by using a specific software application (or "app") associated with the content server 102 which is installed on the communications device 104. In this case, the download signaling message itself may include a hyperlink or the like which, for example, directs the user to a website from which the content item may be downloaded. In another embodiment, the content item is made available for automatic download from the content server 102. For example, the content item may be pushed to each communications device 104 using its known IP address. Once the content item has been made available for download, the process ends at step 614.

It is noted that the broadcast/download signaling message will be periodically transmitted for a predetermined time period after the predetermined time for the content item has arrived. For example, the broadcast/download signaling message may be periodically transmitted (for example, every 10, 20 or 30 seconds) for the playback duration of the content item (if the content item is a movie or TV show, for example). This allows communication devices 104 which are, for example, out of range of the cellular and local wireless access interfaces 108, 110, to receive the broadcast/download signaling message once connection with the cellular or local wireless access interface 108, 110 is re-established.

It is also noted that when the content server 102 determines that the threshold number of content requests has been reached and thus broadcasts the content item, the content server 102 may also make the content item available for download at any time. This means that the entire content item may still be made available to users even if they miss the predetermined time at which it is broadcast or if they are within range of a local wireless access interface 110 prior to the predetermined time and the content proprietor has chosen to make the content item available prior to the predetermined time (see steps 508, 510 and 512 of the process 500 of FIG. 5). Although this may increase the network load, it is expected that the majority of users will still view the broadcast content item, and thus the efficiency of the network is still improved when compared to the situation in which all users view the content item by downloading it. Numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

The following numbered clauses provide further example aspects and features of the present technique:

1. A content server (102) for delivering a content item on demand to communications devices (104), comprising:
a network interface (404) configured to receive a content request from each of the communications devices (104) and, in response to the received content requests, to transmit the content item to each of the communications devices (104) following the arrival of a predetermined time using a network (106) and one of a plurality of wireless access interfaces (108, 110, 112), each of the wireless access interfaces being configured to transmit and/or receive signals using a different radio access technology; and
a control unit (400) configured to cause the content transmitter to select one of the wireless access interfaces (108, 110, 112) for transmitting the content item based on the number of content requests received prior to the arrival of the predetermined time; wherein
the network interface (404) is configured to transmit a signaling message to each of the communications devices (104) signaling the selected wireless access interface (108, 110, 112) prior to transmitting the content item.

2. A content server (102) of clause 1, wherein the plurality of wireless access interfaces comprises a cellular wireless access interface (108), a local wireless access interface (110) and a broadcast wireless access interface (112).

3. A content server (102) of clause 2, wherein the control unit (400) is configured to select the broadcast wireless access interface (112) for the transmission of the content item when the number of content requests received prior to the arrival of the predetermined time reaches a predetermined threshold number and to select the cellular or local wireless access interface (108, 110) for transmission of the content item when the number of content requests received prior to the arrival of the predetermined time does not reach the predetermined threshold.

4. A content server (102) of clause 3, wherein when the broadcast wireless access interface (112) is selected, the network interface (404) is configured to transmit a broadcast signaling message to each of the communications devices (104) as the signaling message, the broadcast signaling message comprising instructions to be processed by each of the communications devices (104) so as to allow each communications device to receive the broadcast content item, and when the cellular or local wireless access interface (108, 110) is selected, the network interface is configured to transmit a download signaling message to each of the communications devices (104) as the signaling message, the download signaling message indicating to each of the communications devices (104) that the content item is to made available for download from the content server (102) using the cellular or local wireless access interface (108, 110).

5. A content server (102) according to any of clauses 2 to 4, wherein the cellular wireless access interface (108) conforms to one of the Global System for Mobile Communications (GSM) or Long-Term Evolution (LTE) standards, the local wireless access interface (110) conforms to one of the Wi-Fi or Bluetooth standards or makes use of unlicensed LTE spectrum (LTE-U), and the broadcast wireless access interface (112) conforms to one of the Digital Video Broadcast-Handheld (DVB-H) or Multimedia Broadcast Multicast Services (MBMS) standards.

6. A communications device (104) for receiving a content item on demand from a content server (102), comprising:
a plurality of communications interfaces (302A-C) each configured to transmit and/or receive signals with a different wireless access interface (108, 110, 112) using a different radio access technology, wherein a first one of the plurality of communications interfaces (302A-C) is configured to transmit a content request to the content server (102), a second one of the plurality of communications interfaces (302A-C) is configured to receive the content item from the content server (102) following the arrival of a predetermined time, and a third one of the plurality of communications interfaces (302A-C) is configured to receive a signaling message from the content server (102) prior to the receiving of the content item by the second communications interface, the signaling message signaling which one of the plurality of communications interfaces (302A-C) is to be the second communications interface for receiving the content item; and
a control unit (300) configured to select the second communications interface for receiving the content item from the plurality of communications interfaces (302A-C) in accordance with the signaling message.

7. A communications device (104) of clause 6, wherein:
the plurality of communications interfaces comprises a cellular communications interface (302A), a local communications interface (302B) and a broadcast communications interface (302C), and:
the first communications interface is one of the cellular and local communications interfaces (302A-B);
the second communications interface is one of the cellular, local or broadcast communications interfaces (302A-C); and
the third communications interface is one of the cellular and local communications interfaces (302A-B).

8. A communications device (104) of clause 7, wherein the control unit (300) is configured to select the cellular or local communications interface (302A-B) as the first and/or third communications interface depending on which of the cellular and local communications interfaces (302A-B) are able to communicate with the content server (102), with preference given to the local communications interface (302B) in the case that both the cellular and local communications interfaces are able to communicate with the content server (102).

9. A communications device (104) according to any of clauses 7 to 8, wherein the signaling message is one of a broadcast signaling message and a download signaling message, wherein:
when the signaling message is the broadcast signaling message, the control unit (300) is configured to select the broadcast communications interface (302C) as the second communications interface, the broadcast signaling message comprising instructions to be processed by the control unit (300) so as to allow the communications device (104) to receive the content item using the broadcast communications interface (302C); and
when the signaling message is the download signaling message, the control unit (300 is configured to select one of the cellular and local communications interfaces (302A-B) as the second communications interface, the download signaling message indicating to the control unit (300) that the content item is to be made available for download from the content server (102) using the cellular or local communications interface (302A-B).

10. A communications device (104) according to claim 9, wherein when the content item is to be made available for download from the content server (102), the cellular or local communications interface (302A-B) is chosen as the second communications interface depending on which of the cellular and local communications interfaces (302A-B) are able to communicate with the content server (102), with preference given to the local communications interface (302B) in the case that both the cellular and local communications interfaces are able to communicate with the content server (102).

11. A communications device (104) according to any of clauses 7 to 10, wherein the cellular communications interface (302A) conforms to one of the Global System for Mobile Communications (GSM) or Long-Term Evolution (LTE) standards, the local communications interface (302B) conforms to one of the Wi-Fi or Bluetooth standards or makes use of unlicensed LTE spectrum (LTE-U), and the broadcast communications interface (302C) conforms to one of the Digital Video Broadcast-Handheld (DVB-H) or Multimedia Broadcast Multicast Services (MBMS) standards.

12. A system comprising a content server (102) according to any of clauses 1 to 5 and a communications device (104) according to any of clauses 6 to 11.

13. A method of delivering a content item on demand to communications devices (104), comprising:

receiving a content request from each of the communications devices (104) and, in response to the received content requests, transmitting the content item to each of the communications devices (104) following the arrival of a predetermined time using a network (106) and one of a plurality of wireless access interfaces (108, 110, 112), each of the wireless access interfaces being configured to transmit and/or receive signals using a different radio access technology; and selecting one of the wireless access interfaces (108, 110, 112) for transmitting the content item based on the number of content requests received prior to the arrival of the predetermined time; wherein a signaling message is transmitted to each of the communications devices (104) signaling the selected wireless access interface (108, 110, 112) prior to transmitting the content item.

14. A program for controlling a computer to perform a method according to claim 13.

15. A recording medium storing a program according to clause 14.

16. A method of receiving a content item on demand from a content server (102), comprising:

transmitting a content request to the content server (102) using a first one of a plurality of communications interfaces (302A-C) each configured to transmit and/or receive signals with a different wireless access interface (108, 110, 112) using a different radio access technology;

receiving the content item from the content server (102) following the arrival of a predetermined time using a second one of the plurality of communications interfaces (302A-C);

receiving a signaling message from the content server (102) using a third one of the plurality of communications interfaces (302A-C) prior to the receiving of the content item by the second communications interface, the signaling message signaling which one of the plurality of communications interfaces (302A-C) is to be the second communications interface for receiving the content item; and selecting the second communications interface for receiving the content item from the plurality of communications interfaces (302A-C) in accordance with the signaling message.

17. A program for controlling a computer to perform a method according to clause 16.

18. A recording medium storing a program according to clause 17.

The invention claimed is:

1. A content server for delivering a content item on demand to communications devices, comprising:

a network interface configured to receive a content request from each of the communications devices and, in response to the received content requests, to transmit the content item to each of the communications devices following a predetermined time using a network and one of a plurality of wireless access interfaces, each of the wireless access interfaces being configured to transmit and/or receive signals using a different radio access technology, the plurality of wireless access interfaces including a cellular wireless access interface, a local wireless access interface, and a broadcast wireless interface; and a controller configured to select one of the wireless access interfaces for transmitting the content item based on a number of content requests received prior to the predetermined time and cost per data unit associated with a respective wireless access interface, wherein the network interface is configured to transmit a signalling message to each of the communications devices prior to transmitting the content item, the signalling message including an internet protocol (IP) address of a respective one of the communications devices and indicating which of the cellular wireless access interface, the local wireless access interface, and the broadcast wireless interface is selected by the controller.

2. The content server of claim 1, wherein the controller is configured to select the broadcast wireless access interface for the transmission of the content item when the number of content requests received prior to the predetermined time reaches a predetermined threshold number and to select the cellular or local wireless access interface for transmission of the content item when the number of content requests received prior to the predetermined time does not reach the predetermined threshold.

3. The content server of claim 2, wherein when the broadcast wireless access interface is selected, the network interface is configured to transmit a broadcast signalling message to each of the communications devices as the signalling message, the broadcast signalling message comprising instructions to be processed by each of the communications devices to allow each communications device to receive the broadcast content item, and when the cellular or local wireless access interface is selected, the network interface is configured to transmit a download signalling message to each of the communications devices as the signalling message, the download signalling message indicating to each of the communications devices that the content item is to made available for download from the content server using the cellular or local wireless access interface.

4. The content server according to claim 1, wherein the cellular wireless access interface conforms to one of the Global System for Mobile Communications (GSM) or Long-Term Evolution (LTE) standards, the local wireless access interface conforms to one of the Wi-Fi or Bluetooth standards or makes use of unlicensed LTE spectrum (LTE-U), and the broadcast wireless access interface conforms to one of the Digital Video Broadcast Handheld (DVB-H) or Multimedia Broadcast Multicast Services (MBMS) standards.

5. A communications device for receiving a content item on demand from a content server, comprising:

a plurality of communications interfaces each configured to transmit and/or receive signals with a different wireless access interface using a different radio access technology, wherein a first one of the plurality of communications interfaces is configured to transmit a content request to the content server, a second one of the plurality of communications interfaces is configured to receive the content item from the content server following a predetermined time, and a third one of the plurality of communications interfaces is configured to receive a signalling message from the content server prior to receipt of the content item by the second communications interface, the signalling message signalling which one of the plurality of communications interfaces is to be the second communications interface for receiving the content item based on a number of content requests received prior to the predetermined time and cost per data unit associated with a respective communication interface, the plurality of communications interfaces including a cellular communications interface, a local communications interface, and a broadcast communications interface; and a controller configured to select the second communications interface for receiving the content item from the plurality of communications interfaces in accordance with the signalling message, the signalling message including an internet protocol (IP) address of the communications device and indicating which of the cellular communications interface, the local communications interface, and the broadcast communications interface is to be selected for receiving the content item.

6. The communications device of claim 5, wherein:
the first communications interface is one of the cellular and local communications interfaces;
the second communications interface is one of the cellular, local or broadcast communications interfaces; and
the third communications interface is one of the cellular and local communications interfaces.

7. The communications device of claim 6, wherein the controller is configured to select the cellular or local communications interface as the first and/or third communications interface depending on which of the cellular and local communications interfaces are able to communicate with the content server, with preference given to the local communications interface in the case that both the cellular and local communications interfaces are able to communicate with the content server.

8. The communications device according to claim 6, wherein the signalling message is one of a broadcast signalling message and a download signalling message, wherein:
when the signalling message is the broadcast signalling message, the controller is configured to select the broadcast communications interface as the second communications interface, the broadcast signalling message comprising instructions to be processed by the controller to allow the communications device to receive the content item using the broadcast communications interface; and
when the signalling message is the download signalling message, the controller is configured to select one of the cellular and local communications interfaces as the second communications interface, the download signalling message indicating to the controller that the content item is to be made available for download from the content server using the cellular or local communications interface.

9. The communications device according to claim 8, wherein when the content em is to be made available for download from the content server, the cellular or local communications interface is chosen as the second communications interface depending on which of the cellular and local communications interfaces are able to communicate with the content server, with preference given to the local communications interface in the case that both the cellular and local communications interfaces are able to communicate with the content server.

10. The communications device according to claim 6, wherein the cellular communications interface conforms to one of the Global System for Mobile Communications (GSM) or Long-Term Evolution (LTE) standards, the local communications interface conforms to one of the Wi-Fi or Bluetooth standards or makes use of unlicensed LTE spectrum (LTE-U), and the broadcast communications interface conforms to one of the Digital Video Broadcast Handheld (DVB-H) or Multimedia Broadcast Multicast Services (MBMS) standards.

11. A system comprising a content server and a communications device, the content server for delivering a content item on demand to the communications device, the content server comprising:
a network interface configured to receive a content request from the communications device and, in response to received content requests, to transmit the content item to the communications device following a predetermined time using a network and one of a plurality of wireless access interfaces, each of the wireless access interfaces being configured to transmit and/or receive signals using a different radio access technology, the plurality of wireless access interfaces including a cellular wireless access interface, a local wireless access interface, and a broadcast wireless interface; and
a controller configured to cause the content transmitter to select one of the wireless access interfaces for transmitting the content item based on a number of content requests received prior to the predetermined time and cost per data unit associated with a respective wireless access interface; wherein
the network interface is configured to transmit a signalling message to the communications device prior to transmitting the content item, the signalling message including an internet protocol (IP) address of the communications device and indicating which of the cellular wireless access interface, the local wireless access interface, and the broadcast wireless interface is selected by the controller.

12. A method of delivering a content item on demand to communications devices, comprising:
receiving a content request from each of the communications devices and, in response to received content requests, transmitting the content item to each of the communications devices following a predetermined time using a network and one of a plurality of wireless access interfaces, each of the wireless access interfaces being configured to transmit and/or receive signals using a different radio access technology, the plurality of wireless access interfaces including a cellular wireless access interface, a local wireless access interface, and a broadcast wireless interface; and
selecting one of the wireless access interfaces for transmitting the content item based on a number of content requests received prior to the predetermined time and cost per data unit associated with a respective wireless access interface; wherein
a signalling message is transmitted to each of the communications devices signalling the selected wireless access interface prior to transmitting the content item, the signalling message including an internet protocol (IP) address of a respective one of the communications devices and indicated which of the cellular wireless access interface, the local wireless access interface, and the broadcast wireless access interface is to be selected for receiving the content item.

13. A non-transitory computer readable medium including computer-readable instructions that, when executed by a computer, cause the computer to perform a method according to claim 12.

14. A method of receiving a content item on demand from a content server, comprising:

transmitting a content request to the content server using a first one of a plurality of communications interfaces each configured to transmit and/or receive signals with a different wireless access interface using a different radio access technology, the plurality of communications interfaces including a cellular communications interface, a local communications interface, and a broadcast communications interface;

receiving the content item from the content server following a predetermined time using a second one of the plurality of communications interfaces;

receiving a signalling message from the content server using a third one of the plurality of communications interfaces prior to receipt of the content item by the second communications interface, the signalling message signalling which one of the plurality of communications interfaces is to be the second communications interface for receiving the content item based on a number of content requests received prior to the predetermined time cost per data unit associated with a respective communications interface; and selecting the second communications interface for receiving the content item from the plurality of communications interfaces in accordance with the signalling message, the signalling message including an internet protocol (IP) address of the communications device and indicating which of the cellular communications interface, the local communications interface, and the broadcast communications interface is to be selected for receiving the content item.

15. A non-transitory computer readable medium including computer readable instructions that, when executed by a computer, cause the computer to perform a method according to claim 14.

\* \* \* \* \*